(12) United States Patent
Cho et al.

(10) Patent No.: US 9,172,081 B2
(45) Date of Patent: Oct. 27, 2015

(54) NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(71) Applicant: UNIST Academy-Industry Research Corporation, Ulsan (KR)

(72) Inventors: Jaephil Cho, Yongin-si (KR); Mi Hee Park, Miryang-si (KR)

(73) Assignee: UNIST ACADEMY-INDUSTRY RESEARCH CORPORATION, Ulsan (KR)

( * ) Notice: Subject to any disclaimer, the term of this patent is extended or adjusted under 35 U.S.C. 154(b) by 245 days.

(21) Appl. No.: 13/798,567

(22) Filed: Mar. 13, 2013

(65) Prior Publication Data
US 2013/0193109 A1    Aug. 1, 2013

Related U.S. Application Data

(62) Division of application No. 12/655,034, filed on Dec. 22, 2009.

(30) Foreign Application Priority Data

Sep. 30, 2009   (KR) .................. 10-2009-0093504

(51) Int. Cl.
*H01M 4/04* (2006.01)
*H01M 4/134* (2010.01)
(Continued)

(52) U.S. Cl.
CPC .......... *H01M 4/0402* (2013.01); *H01M 4/0473* (2013.01); *H01M 4/134* (2013.01); *H01M 4/1395* (2013.01); *H01M 4/366* (2013.01); *H01M 4/38* (2013.01); *H01M 4/625* (2013.01); *H01M 10/052* (2013.01); *H01M 2004/021* (2013.01); *Y02E 60/122* (2013.01)

(58) Field of Classification Search
CPC . H01M 4/0402; H01M 4/0473; H01M 4/134; H01M 4/1395; H01M 4/366; H01M 4/38; H01M 4/625; H01M 4/621
See application file for complete search history.

(56) References Cited

U.S. PATENT DOCUMENTS

| 5,512,393 A | 4/1996 | Harada et al. |
| 2002/0039677 A1 | 4/2002 | Iwamoto |

(Continued)

OTHER PUBLICATIONS

United States Patent and Trademark Office, Office Action against U.S. Appl. No. 12/655,034, filed Feb. 21, 2014.

*Primary Examiner* — Raymond Alejandro
(74) *Attorney, Agent, or Firm* — Lex IP Meister, PLLC

(57) ABSTRACT

The invention relates to a negative active material for a rechargeable lithium battery, including an inner layer including a material being capable of doping and dedoping lithium, a carbon layer outside the inner layer, and an outer layer disposed on the carbon layer and including a material being capable of doping and dedoping lithium. The materials being capable of doping and dedoping lithium may be the same or different from each other. The invention further relates to a method of preparing the negative active material including: preparing a tube-shaped template with a hollow part; forming an outer layer including a material which can dope and dedope lithium inside the template; forming an inner precursor layer including a material which can dope and dedope lithium modified with an organic functional group inside the outer layer; annealing the template; and removing the template.

6 Claims, 13 Drawing Sheets

(51) Int. Cl.
*H01M 4/1395* (2010.01)
*H01M 4/36* (2006.01)
*H01M 4/38* (2006.01)
*H01M 4/62* (2006.01)
*H01M 10/052* (2010.01)
*H01M 4/02* (2006.01)

(56) References Cited

U.S. PATENT DOCUMENTS

| | | |
|---|---|---|
| 2003/0054249 A1 | 3/2003 | Yamamoto et al. |
| 2003/0091898 A1 | 5/2003 | Dexter |
| 2003/0096167 A1 | 5/2003 | Park |
| 2005/0238957 A1* | 10/2005 | Kim et al. ............ 429/212 |
| 2006/0133980 A1 | 6/2006 | Nanba |
| 2007/0218365 A1* | 9/2007 | Takezawa et al. ........ 429/231.95 |
| 2008/0213664 A1* | 9/2008 | Krasnov et al. ............ 429/220 |
| 2008/0286656 A1 | 11/2008 | Cho et al. |
| 2009/0183994 A1* | 7/2009 | Misra et al. ............ 205/340 |
| 2009/0214956 A1* | 8/2009 | Prieto et al. ............ 429/310 |
| 2010/0009260 A1 | 1/2010 | Tanaka et al. |
| 2010/0285358 A1 | 11/2010 | Cui |

* cited by examiner

NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application is a Divisional Application of U.S. patent application Ser. No. 12/655,034 (pending), which was filed on Dec. 22, 2009, which claims priority to Korean Patent Application No. 10-2009-0093504 filed in the Korean Intellectual Property Office on Sep. 30, 2009, the entire content of which is incorporated herein by reference.

BACKGROUND OF THE INVENTION (a) Field of the Invention

This disclosure relates to a negative active material for a rechargeable lithium battery, a method of preparing the same, and a rechargeable lithium battery including the same.

(b) Description of the Related Art

Batteries generate electrical power using an electrochemical reaction material for a positive electrode and a negative electrode. Rechargeable lithium batteries generate electrical energy from changes of chemical potential during the intercalation/deintercalation of lithium ions at the positive and negative electrodes.

The rechargeable lithium batteries include materials that reversibly intercalate or deintercalate lithium ions during charge and discharge reactions for both positive and negative active materials, and also include an organic electrolyte or a polymer electrolyte between the positive and negative electrodes.

For the positive active material for a rechargeable lithium battery, composite metal oxides such as $LiCoO_2$, $LiMn_2O_4$, $LiNiO_2$, $LiNi_{1-x}Co_xO_2$ ($0<x<1$), $LiMnO_2$, and so on have been researched.

As for the negative active material of a rechargeable lithium battery, various carbon-based materials such as artificial graphite, natural graphite, and hard carbon, which can all intercalate and deintercalate lithium ions, have been used. Graphite among the carbon-based materials increases discharge voltages and energy density for a battery, because it has a low discharge potential of −0.2V compared with lithium. A battery including this graphite as a negative active material has a high average discharge potential of 3.6V and an advantage of excellent energy density. Furthermore, graphite is most comprehensively used among the above carbon-based materials, since graphite guarantees better cycle life due to its outstanding reversibility. However, a graphite active material has a low density of 1.6 g/cc and consequently a low capacity in terms of energy density per unit volume when the graphite is used as a negative active material.

In order to solve these problems, a great deal of research on a high-capacity negative active material has recently been performed.

SUMMARY OF THE INVENTION

One aspect of this disclosure provides a negative active material for a rechargeable lithium battery having excellent coulomb efficiency, rate capability, and cycle life characteristics.

Another aspect of this disclosure provides a method of preparing the negative active material.

Yet another aspect of this disclosure provides a rechargeable lithium battery including the negative active material.

According to one aspect of the present invention, provided is a negative active material for a rechargeable lithium battery including: an inner layer including a material being capable of doping and dedoping lithium; a carbon layer outside the inner layer; and an outer layer disposed on the carbon layer and including a material being capable of doping and dedoping lithium. The materials being capable of doping and dedoping lithium in the inner layer and in the outer layer are the same or different from each other.

The negative active material for a rechargeable lithium battery has a tube or bar shape. The tube-shaped negative active material for a rechargeable lithium battery further includes a hollow part inside the inner layer.

The material being capable of doping and dedoping lithium in the inner layer includes one selected from the group consisting of silicon (Si), a Si—$Y_1$ alloy, tin (Sn), a Sn—$Y_2$ alloy, antimony (Sb), germanium (Ge), lead (Pb), and a combination thereof, wherein $Y_1$ and $Y_2$ are the same or different and are selected from the group consisting of an alkali metal, an alkaline-earth metal, a group 13 element, a group 14 element, transition elements, a rare earth element, and a combination thereof, provided that $Y_1$ is not silicon (Si) and $Y_2$ is not tin (Sn).

The material being capable of doping and dedoping lithium in the outer layer includes one selected from the group consisting of silicon (Si), $SiO_x$ ($0<x<2$), a Si—$Y_3$ alloy, tin (Sn), $SnO_2$, a Sn—$Y_4$ alloy, antimony (Sb), germanium (Ge), lead (Pb), and a combination thereof, wherein $Y_3$ and $Y_4$ are the same or different and are selected from the group consisting of an alkali metal, an alkaline-earth metal, a group 13 element, a group 14 element, a transition element, a rare earth element, and a combination thereof, provided that $Y_3$ is not silicon (Si) and $Y_4$ is not tin (Sn).

Examples of $Y_1$, $Y_2$, $Y_3$, and $Y_4$ include one selected from the group consisting of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), silicon (Si), tin (Sn), indium (In), germanium (Ge), phosphorus (P), arsenic (As), antimony (Sb), bismuth (Bi), sulfur (S), selenium (Se), tellurium (Te), polonium (Po), and a combination thereof.

The materials being capable of doping and dedoping lithium in the inner layer and in the outer layer have a weight ratio ranging from about 10:90 to about 50:50.

The negative active material for a rechargeable lithium battery has a specific surface area ranging from about 2 to about 70 m²/g.

It may have a length ranging from about 5 μm to about 200 μm and a diameter ranging from about 200 nm to about 300 nm.

It may further include a carbon layer inside the inner layer.

The carbon included in the carbon layer outside the inner layer and the carbon included in the carbon layer inside the inner layer may be amorphous.

The outer layer may be about 10 nm to about 50 nm thick.

According to another aspect of the present invention, provided is a method including: preparing a tube-shaped template with a hollow part; forming an outer layer including a material being capable of doping and dedoping lithium inside the template; forming an inner precursor layer including a material being capable of doping and dedoping lithium which is modified with an organic functional group inside the outer layer; annealing the template; and removing the template.

The organic functional group may be marked as $C_nH_m$, and the n and m may be integers of 1 or more. The organic functional group may be selected from the group consisting of a C1 to C30 aliphatic group, a C3 to C30 alicyclic group, a C6 to C30 aromatic group, and a combination thereof.

The annealing may be performed at a temperature ranging from about 700° C. to about 1100° C.

The removal of the template may be performed using a basic or acidic material. The basic or acidic material may have a concentration ranging from about 1 M to about 6 M.

According to another aspect of the present invention, provided is a rechargeable lithium battery including a negative electrode including the negative active material, a positive electrode including a positive active material, and an electrolyte.

Hereinafter, further embodiments of the present invention will be described in detail.

The negative active material for a rechargeable lithium battery has excellent coulomb efficiency, rate capability, and cycle life characteristics.

DETAILED DESCRIPTION OF THE EMBODIMENTS

Figure 1A:
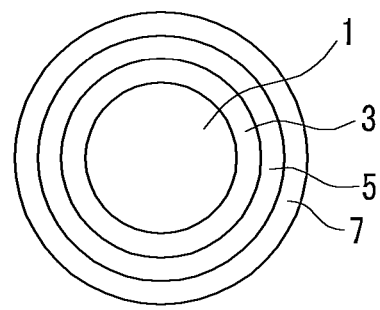
FIG. 1A provides a cross-sectional view showing a negative active material for a rechargeable lithium battery according to one embodiment of the present invention.

Exemplary embodiments of the present disclosure will hereinafter be described in detail referring to the following accompanied drawings and can be easily performed by those who have common knowledge in the related art. However, these embodiments are only exemplary, and the present invention is not limited thereto.

In the drawings, the thickness of layers, films, panels, regions, etc., are exaggerated for clarity. Like reference numerals designate like elements throughout the specification.

It will be understood that when an element such as a layer, a film, a region, or a substrate is referred to as being "on" another element, it can be directly on the other element, or an intervening element may also be present. In contrast, when an element is referred to as being "directly on" another element, there are no intervening elements present.

With no particular explanation in the specification, the term "hollow part" means a space in the middle of a tube, and the term "surface" means inside, outside, or a combination thereof.

According to one aspect of the present invention, provided is a negative active material for a rechargeable lithium battery including: an inner layer including a material being capable of doping and dedoping lithium; a carbon layer outside the inner layer; and an outer layer disposed on the carbon layer and including a material being capable of doping and dedoping lithium. The materials being capable of doping and dedoping lithium in the inner layer and in the outer layer may be the same or different from each other.

The negative active material for a rechargeable lithium battery may have a tube or bar shape. It may further include a hollow part inside the inner layer when it has a tube shape.

Figure 1B:
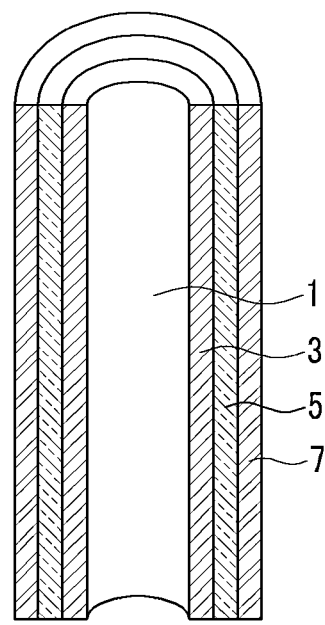
FIG. 1B provides a longitudinal sectional view showing a negative active material for a rechargeable lithium battery according to one embodiment of the present invention.

Hereinafter, referring to FIGS. 1A and 1B, a negative active material for a rechargeable lithium battery according to one embodiment of the present invention is illustrated. FIGS. 1A and 1B show a tube-shaped negative active material for a rechargeable lithium battery. However, it may have a bar shape having no hollow part, and is not limited thereto.

FIG. 1A provides the cross-sectional view of a negative active material 10 for a rechargeable lithium battery. FIG. 1B provides a longitudinal sectional view of a negative active material 10 for a rechargeable lithium battery according to one embodiment of the present invention. The negative active material 10 for a rechargeable lithium battery may have a tube shape including: a hollow part 1; an inner layer 3 positioned along the perimeter of the hollow part 1 and including a material being capable of doping and dedoping lithium; a carbon layer 5 outside the inner layer 3; and an outer layer 7 disposed on the carbon layer 5 and including a material being capable of doping and dedoping lithium. When it has a tube shape, an electrolyte may enter the hollow part and easily dope and dedope lithium ions, efficiently improving rate capability.

The surface at the hollow part 1 of the inner layer 3, the interface between the inner layer 3 and the carbon layer 5, the interface between the carbon layer 5 and the outer layer 7, and the external surface of the outer layer 7 may be smooth or uneven. They may have no particular limit, as long as each constituent element may contact one another and can form one tube-shaped negative active material 10 for a rechargeable lithium battery.

The materials being capable of doping and dedoping lithium in the inner layer 3 and in the outer layer 7 may be the same or different from each other.

The material being capable of doping and dedoping lithium in the inner layer 3 includes one selected from the group consisting of silicon (Si), a Si—$Y_1$ alloy, tin (Sn), a Sn—$Y_2$ alloy, antimony (Sb), germanium (Ge), lead (Pb), and a combination thereof. $Y_1$ and $Y_2$ are the same or different and are selected from the group consisting of an alkali metal, an alkaline-earth metal, a group 13 element, a group 14 element, a transition element, a rare earth element, and a combination thereof, provided that $Y_1$ is not silicon (Si) and $Y_2$ is not tin (Sn). Examples of $Y_1$ and $Y_2$ include one selected from the group consisting of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), silicon (Si), tin (Sn), indium (In), germanium (Ge), phosphorus (P), arsenic (As), antimony (Sb), bismuth (Bi), sulfur (S), selenium (Se), tellurium (Te), polonium (Po), and a combination thereof, but are not limited thereto.

The material being capable of doping and dedoping lithium in the inner layer 3 may be crystalline, amorphous, or a combination thereof. When the material being capable of doping and dedoping lithium in the inner layer 3 is crystalline, it may have a grain diameter ranging from about 1 nm to about 20 nm, and in particular about 5 nm to about 10 nm, but is not limited thereto.

For example, the material being capable of doping and dedoping lithium in the inner layer 3 may be silicon (Si). The silicon (Si) may be crystalline before the charge and discharge. Then, when charged and discharged, the silicon (Si) may be changed from crystalline to amorphous. When the silicon (Si) included in the inner layer 3 is changed to amorphous, it may have an isotropic volume change during the charge and discharge. Accordingly, it can play a role of buffering against volume expansion and contraction of a material being capable of doping and dedoping lithium included in an outer layer 7, and thus prevents or alleviates its pulverization as well as capacity fading. As a result, a rechargeable lithium battery including a negative active material for a rechargeable lithium battery according to the present invention can have improved reversible capacity, coulomb efficiency, rate capability, and cycle-life characteristics.

The inner layer 3 may have a thickness ranging from about 10 nm to about 50 nm. In particular, it may have a thickness ranging from about 10 nm to about 40 nm. More specifically, it may have a thickness ranging from about 20 nm to about 40 nm. When the inner layer 3 has the above thickness, it may play a role of effectively buffering against volume expansion and contraction of a material being capable of doping and dedoping lithium included in the outer layer 7.

The carbon layer 5 outside the inner layer prevents a material being capable of doping and dedoping lithium included in the inner layer 3 from contacting a material being capable of doping and dedoping lithium included in the outer layer 7, and thereby reacting with each other. In addition, a side reaction of the material being capable of doping and dedoping lithium with an electrolyte solution is prevented or alleviated.

Furthermore, the carbon included in the carbon layer 5 outside the inner layer may be amorphous. This carbon layer 5 outside the inner layer may have an isotropic volume change during the charge and discharge. In this way, it can play a role of buffering against volume expansion and contraction of the materials being capable of doping and dedoping lithium included in the inner layer 3 and in the outer layer 7, and thereby prevents or alleviates their pulverization as well as capacity fading.

As a result, a rechargeable lithium battery including a negative active material according to one embodiment of the present invention may have improved reversible capacity, coulomb efficiency, rate capability, and cycle-life characteristics.

The carbon layer 5 outside the inner layer may be about 1 nm to about 10 nm thick, but is not limited thereto.

The material being capable of doping and dedoping lithium in the outer layer 7 includes one selected from the group consisting of silicon (Si), $SiO_x$ (0<x<2), a Si—$Y_3$ alloy, tin (Sn), $SnO_2$, a Sn—$Y_4$ alloy, antimony (Sb), germanium (Ge), lead (Pb), and a combination thereof. Examples of $Y_3$ and $Y_4$ include one selected from the group consisting of an alkali metal, an alkaline-earth metal, a group 13 element, a group 14 element, a transition element, a rare earth element, and a combination thereof, provided that $Y_3$ is not silicon (Si) and $Y_4$ is not tin (Sn). Examples of $Y_3$ and $Y_4$ include one selected from the group consisting of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), silicon (Si), tin (Sn), indium (In), germanium (Ge), phosphorus (P), arsenic (As), antimony (Sb), bismuth (Bi), sulfur (S), selenium (Se), tellurium (Te), polonium (Po), and a combination thereof, but are not limited thereto.

The material being capable of doping and dedoping lithium in the outer layer 7 may be crystalline, amorphous, or a combination thereof. Since it can easily dope and dedope lithium, it can improve reversible capacity, coulomb efficiency, rate capability, and cycle-life characteristics when it is used for a negative active material. When the material being capable of doping and dedoping lithium in the outer layer 7 is crystalline, it has a grain diameter ranging from about 1 nm to about 20 nm. In particular, it may have a grain diameter ranging from about 5 nm to about 10 nm, but is not limited thereto.

The outer layer 7 may be about 10 nm to about 50 nm thick. In particular, it may be about 10 nm to about 40 nm thick, and more specifically, from about 20 nm to about 40 nm thick. When the outer layer 7 has a thickness within the range, it may effectively buffer against volume expansion and contraction of the material being capable of doping and dedoping lithium in the inner layer 3.

The materials being capable of doping and dedoping lithium included in the inner layer 3 and the outer layer 7 may have a weight ratio ranging from about 10:90 to 50:50, in one embodiment, about 40:60 to 20:80, and in one embodiment, about 40:60 to 50:50. When they have a weight ratio within the range, it may improve reversible capacity of a rechargeable lithium battery and also have buffering effects against volume expansion and contraction.

The carbon may be included in an amount of about 1 to about 20 wt % based on the entire amount of the negative active material for a rechargeable lithium battery, but is not limited thereto.

The negative active material for a rechargeable lithium battery may have a specific surface area ranging from about 2 to about 70 m²/g, in particular, from about 10 to about 50 m²/g, and more specifically, from about 30 to about 40 m²/g. When it has a specific surface area within the range, it may improve the high rate characteristic and suppress side reaction with an electrolyte, decreasing non-reversible capacity.

The negative active material for a rechargeable lithium battery may have a length ranging from about 5 μm to about 200 μm, in particular, about 2 μm to about 200 μm, and more specifically, from about 1 to about 50 μm. In addition, the tube-shaped negative active material for a rechargeable lithium battery may have a diameter ranging from about 200 nm to about 300 nm. When it has a length and a diameter within the range, it may have an advantage of volume expansion decrease.

Even though not shown in FIGS. 1A and 1B, the negative active material may further include a carbon layer inside the inner layer.

The carbon layer inside the inner layer may include amorphous carbon. It may have an isotropic volume change during the charge and discharge. Accordingly, it can buffer against volume expansion and contraction of the materials being capable of doping and dedoping lithium in the inner layer and the outer layer, and weaken capacity fading.

According to one embodiment of the present invention, provided is a method of preparing the negative active material including: preparing a tube-shaped template with a hollow part; forming an outer layer including a material being capable of doping and dedoping lithium inside the template; forming an inner precursor layer including a material being capable of doping and dedoping lithium which is modified with an organic functional group inside the outer layer; annealing the template; and removing the template.

Figure 2A:
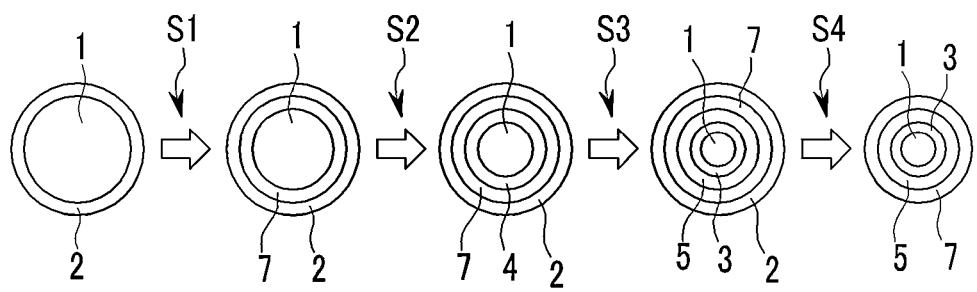
FIGS. 2A and 2B show a process chart of fabricating a negative active material for a rechargeable lithium battery according to one embodiment of the present invention.
Figure 2B:
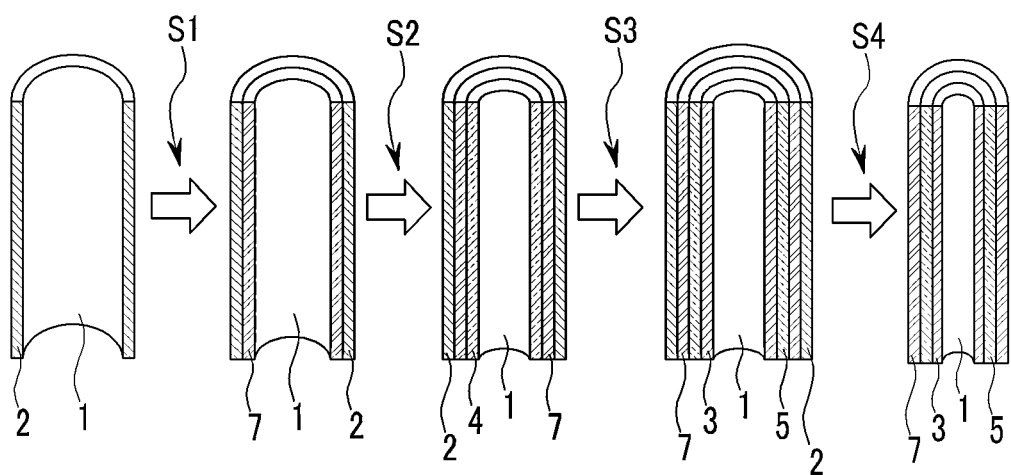

Hereinafter, the method of preparing a negative active material for a rechargeable lithium battery according to one embodiment of the present invention is illustrated referring to FIGS. 2A and 2B. A material being capable of doping and dedoping lithium, a carbon layer, an inner layer, an outer layer, and a negative active material for a rechargeable lithium battery are the same as aforementioned, unless there is a specific contrary explanation. FIGS. 2A and 2B show that a negative active material for a rechargeable lithium batter has a tube shape, but is not limited thereto. Accordingly, it may have a bar shape with no hollow part inside.

First of all, a tube-shaped template 2 is prepared to have a hollow part 1. The template 2 may include silica, alumina, titania, seria, zirconia, or a combination thereof, but is not limited thereto. It has a hollow part 1 with a diameter ranging from about 200 nm to about 350 nm. When the hollow part 1 has a diameter within the range, it may be easy to prepare a negative active material for a rechargeable lithium battery.

Next, an outer layer 7 including a material being capable of doping and dedoping lithium is formed inside the template (S1). It may be formed in a method of immersing, coating, and the like, or in any other method as long as the outer layer including a material being capable of doping and dedoping lithium is formed.

As an example, the immersing method is illustrated as follows. First of all, the template is immersed in the precursor solution of a material being capable of doping and dedoping lithium included in an outer layer for about 1 to about 5 hours. The precursor solution of a material being capable of doping and dedoping lithium in the outer layer may have a concentration ranging from about 0.5 M to about 2 M. The template including a precursor layer of a material being capable of doping and dedoping lithium in the immersing method is put on a filtering sheet and allowed to stand for about 1 to about 20 minutes under vacuum. Then, it is dried at a temperature ranging from about 100° C. to about 200° C. for about 1 to about 5 hours. After the drying, it is calcinated at a temperature ranging from about 500° C. to about 1000° C. for about 1 to about 5 hours. In this way, the template 2 includes an outer layer 7 including a material being capable of doping and dedoping lithium thereinside. The process is not limited by the conditions, and may be adjusted by the precursor of a material being capable of doping and dedoping lithium.

The precursor of a material being capable of doping and dedoping lithium may include $SnCl_4$, $Sn F_4$, and the like, but is not limited thereto.

Then, an inner precursor layer 4 including a material being capable of doping and dedoping lithium which is modified with an organic functional group is formed on the outer layer 7 (S2). FIGS. 2A and 2B show that the template has a hollow part inside the inner precursor layer, but is not limited thereto. It may have no hollow part thereinside.

The organic functional group may include $C_nH_m$ (herein, n and m are integers of 1 or more), and in particular, may be a functional group selected from the group consisting of an aliphatic group, an alicyclic group, an aromatic group, and a combination thereof. The aliphatic group may include a C1 to C30 alkyl group, and in particular, a C1 to C15 alkyl group; a C2 to C30 alkenyl group, and in particular, a C2 to C18 alkenyl group; or a C2 to C30 alkynyl group, and in particular, a C2 to C18 alkynyl group. The alicyclic group may include a C3 to C30 cycloalkyl group, and in particular, a C3 to C18 cycloalkyl group; a C3 to C30 cycloalkenyl group, and in particular, a C3 to C18 cycloalkenyl group; or a C3 to C30 cycloalkynyl group, and in particular, a C5 to C18 cycloalkynyl group. The aromatic group may include a C6 to C30 aryl group, and in particular, a C6 to C18 aryl group. The organic functional group may be further selected from the group consisting of a methyl group, an ethyl group, a propyl group, a butyl group, a cyclo propyl group, a cyclo butyl group, a cyclo pentyl group, a cyclo hexyl group, a phenyl group, and a combination thereof, but is not limited thereto.

The process of modifying the material being capable of doping and dedoping lithium with an organic functional group is well-known and is not illustrated here since it is understood by a person of ordinary skill in the art.

Then, the template including an outer layer including a material being capable of doping and dedoping lithium inside is immersed in a gel or a solution including a material being capable of doping and dedoping lithium which is modified with an organic functional group in a common process for about 30 minutes to about one hour. Then, the template including a layer including a material being capable of doping and dedoping lithium which is modified with an organic functional group on the outer layer including a material being capable of doping and dedoping lithium is put on a filtering sheet and allowed to stand for about 5 to about 30 minutes under vacuum. Next, it is dried at a temperature ranging from about 100° C. to about 200° C. for about 10 to about 20 hours. The immersing and drying processes are repeated 1 to 7 times, and in particular, 2 to 6 times, and more specifically, 2 to 5 times. In this way, an inner precursor layer 4 including a material being capable of doping and dedoping lithium which is modified with an organic functional group is formed on the outer layer 7. These processes are not limited to the conditions, but can be adjusted depending on a material being capable of doping and dedoping lithium.

Next, the template 2 including the outer layer 7 including a material being capable of doping and dedoping lithium and the inner precursor layer 4 including a material being capable of doping and dedoping lithium which is modified with an organic functional group is annealed (S3).

The annealing process decomposes an organic functional group from a material being capable of doping and dedoping lithium which is modified with the organic functional group, leaving carbon. The inner precursor layer 4 including the material being capable of doping and dedoping lithium which is modified with an organic functional group is changed into an inner layer 3 including a material being capable of doping and dedoping lithium and a carbon layer formed on the surface of the inner layer 3.

The carbon layer may be formed between the inner layer 3 including a material being capable of doping and dedoping lithium and the outer layer 7 including a material being capable of doping and dedoping lithium, between the inner layer 3 including a material being capable of doping and dedoping lithium and the hollow part 1 (not shown), inside the inner layer 3 including a material being capable of doping and dedoping lithium (not shown), or a combination thereof.

When the carbon layer is formed between the inner layer 3 including a material being capable of doping and dedoping lithium and the hollow part 1, the material being capable of doping and dedoping lithium included in the inner layer 3 may not be easily dissolved in an acidic or basic aqueous solution during the template removal process.

The annealing process may be performed at a temperature ranging from about 700° C. to about 1100° C., in particular, from about 800° C. to about 1000° C., and more specifically, from about 900° C. to about 1000° C. When it is performed within the range, silicon crystalline is uniformly distributed.

The annealing may be performed under a vacuum atmosphere or inert atmosphere, preventing a side reaction. The inert atmosphere may include an argon atmosphere or a nitrogen atmosphere, but is not limited thereto.

Then, the template 2 is removed (S4).

The template 2 is removed using a basic material such as sodium hydroxide, potassium hydroxide, and the like, or an acidic material such as HF and the like, after the annealing process. The process is sufficiently performed until the template 2 can be removed, for example, for about 2 to about 10 hours.

The basic material or the acidic material may have a concentration ranging from about 1 M to about 6 M, in particular, about 2 M to about 6 M, and more specifically, about 2 M to about 4 M. When it has a concentration within the range, the material being capable of doping and dedoping lithium in the outer layer 7 covered with the template 2 may not be easily dissolved, preparing a tube-shaped negative active material with desired length and diameter.

This process makes it possible to prepare a negative active material for a rechargeable lithium battery according to one embodiment of the present invention.

The negative active material according to one embodiment of the present invention may be usefully applied to a negative electrode of an electrochemical cell like a rechargeable lithium battery. The rechargeable lithium battery may include a positive electrode including a positive active material and an electrolyte as well as the negative electrode.

The negative electrode is fabricated by mixing a negative active material of the present invention, a conductive material, a binder, and a solvent to prepare a negative active material composition, then directly coating it on a copper current collector and drying it. Alternatively, the negative active material composition is coated on a separate supporter and then peeled off from the supporter. Then, the film is laminated on an aluminum current collector.

The conductive material includes carbon black, graphite, and a metal powder, and the binder includes a vinylidenefluoride/hexafluoropropylene copolymer, polyvinylidenefluoride, polyacrylonitrile, polymethylmethacrylate, polytetrafluoroethylene, and mixtures thereof, but is not limited thereto. The solvent includes N-methylpyrrolidone, acetone, tetrahydrofuran, decane, and the like. Herein, the amounts of the negative active material, the conductive material, the binder, and the solvent are the same as commonly used in a rechargeable lithium battery.

Like the negative electrode, the positive electrode is fabricated by preparing an positive active material composition by mixing a positive active material, a binder, and a solvent, coating the composition on an aluminum current collector or coating it on a separate supporter, peeling it, and then laminating the film on a copper current collector. Herein, the positive active material composition may further include a conductive material, if necessary.

The positive active material may include a material that can intercalate/deintercalate lithium, for example a metal oxide, a lithium composite metal oxide, a lithium composite metal sulfide, a lithium composite metal nitride, and the like.

Non-limiting examples of the separator materials include polyethylene, polypropylene, and polyvinylidene fluoride, and multi-layers thereof can be used, such as for a polyethylene/polypropylene double-layered separator, a polyethylene/polypropylene/polyethylene triple-layered separator, and a polypropylene/polyethylene/polypropylene triple-layered separator.

The electrolyte charged for a rechargeable lithium battery may include a non-aqueous electrolyte, a solid electrolyte, or the like, in which a lithium salt is dissolved.

The solvent for a non-aqueous electrolyte includes, but is not limited to, cyclic carbonates such as ethylene carbonate, diethylene carbonate, propylene carbonate, butylene carbonate, vinylene carbonate, and the like, linear carbonates such as dimethyl carbonate, ethylmethyl carbonate, diethyl carbonate, and the like, esters such as methyl acetate, ethyl acetate, propyl acetate, methyl propionate, ethyl propionate, γ-butyrolactone, and the like, ethers such as 1,2-dimethoxyethane, 1,2-diethoxyethane, tetrahydrofuran, 1,2-dioxane, 2-methyltetrahydrofuran, nitriles such as acetonitrile, and amides such as dimethyl formamide. They may be used singularly or in plural. In particular, it may include a mixed solvent of a cyclic carbonate and a linear carbonate.

In addition, the electrolyte may include a gel-type polymer electrolyte prepared by impregnating an electrolyte solution in a polymer electrolyte such as polyethyleneoxide, polyacrylonitrile, and the like, or an inorganic solid electrolyte such as LiI and $Li_3N$, but is not limited thereto.

The lithium salt includes at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlO_2$, $LiAlCl_4$, LiCl, and LiI, but is not limited thereto.

The following examples illustrate the present invention in more detail. However, it is understood that the present invention is not limited by these examples.

EXAMPLES

Preparation Example 1

Preparation of Silicon Modified with a Butyl Group 30 g of $SiCl_4$ (purity of 99.999%, Aldrich Co.) was completely mixed with 100 g of 1,2-dimethoxyethane. The mixed solution was decanted with a sodium naphthalide solution and then refluxed at 400° C. for 1 hour. The resulting solution was mixed with 40 ml of a n-butyllithium, a Grignard agent. The mixture was agitated for one night. Herein, the n-butyllithium reacted with $SiCl_4$ and formed silicon modified with a butyl group. Then, the solvent and the naphthalene were removed by heating the mixture under vacuum at 120° C. with a rotating evaporator. In addition, NaCl and LiCl byproducts were removed using an excess amount of n-hexane and water. The final product, silicon modified with a butyl group, was a light yellow viscous gel.

Example 1

Preparation of a Negative Active Material for a Rechargeable Lithium Battery

An alumina (Anodisc, Whatman Co.) template having a hollow part with a 250 nm diameter was immersed in a 0.6M $SnCl_4$ aqueous solution (Aldrich 99%) under an air atmosphere for 4 hours. The alumina template having a hollow part was positioned on a filtering sheet and treated under vacuum for 10 minutes. Next, it was dried at 150° C. for 3 hours and then calcinated at 600° C. under an air atmosphere for 3 hours. Therefore, the alumina template having a hollow part may include an outer layer including $SnO_2$ inside.

The template including an outer layer including $SnO_2$ inside was immersed in a solution prepared by mixing the silicon gel modified with a butyl group (butyl-capped Si) according to Preparation Example 1 with hexane in a weight ratio of 50:50 for 30 minutes, and then positioned on a filtering sheet and treated under vacuum for 10 minutes. Next, it was dried at 150° C. under vacuum. The immersing and drying processes were repeated three times. Next, the template was annealed at 1000° C. under an argon (Ar) atmosphere. Then, it was removed through etching with a 2 M NaOH solution for 2 hours, and then washed four times with distilled water. In this way, a negative active material for a rechargeable lithium battery was prepared to have a tube shape according to one embodiment of the present invention.

Example 2

Preparation of a Negative Active Material for a Rechargeable Lithium Battery

An alumina (Anodisc, Whatman Co.) template having a hollow part with a 250 nm diameter was immersed in a 0.6M $SnCl_4$ aqueous solution (Aldrich 99%) for 4 hours under an air atmosphere. The alumina template having a hollow part was positioned on a filtering sheet and treated under vacuum for 10 minutes. It was dried at 150° C. for 3 hours and calcinated at 600° C. under an air atmosphere for 3 hours. Thus, an outer layer including $SnO_2$ was formed inside the alumina template having a hollow part.

The template including a $SnO_2$-containing outer layer inside was immersed in a solution prepared by mixing a silicon gel modified with a butyl group (butyl-capped Si) according to Preparation Example 1 with hexane in a weight ratio of 30:70 for 10 minutes, and then positioned on a filtering sheet and treated under vacuum for 10 minutes. Then, it was dried at 150° C. under vacuum. The immersing and drying processes were repeated three times. Next, the template was annealed at 1000° C. under an argon (Ar) atmosphere. Then, it was removed through etching with a 2 M NaOH solution for 2 hours, and then washed four times with distilled water. In this way, a negative active material for a rechargeable lithium battery was prepared to have a tube shape according to one embodiment of the present invention.

Example 3

Preparation of a Negative Active Material for a Rechargeable Lithium Battery

A negative active material for a rechargeable lithium battery was prepared according to the same method as Example 1, except for repeating the immersing and drying processes six times. The negative active material for a rechargeable lithium battery had a bar shape.

Example 4

Preparation of a Negative Active Material for a Rechargeable Lithium Battery

A negative active material for a rechargeable lithium battery was prepared according to the same method as Example 2, except for repeating the immersing and drying processes six times. The negative active material for a rechargeable lithium battery had a bar shape.

Example 5

Fabrication of a Rechargeable Lithium Battery

The negative active material for a rechargeable lithium battery according to Example 1 was mixed with super-P carbon black and a poly(vinylidene fluoride) binder in a weight ratio of 80:10:10 in an N-methyl pyrrolidone solvent, preparing a negative active material slurry. The negative active material slurry was coated on a 50 µm-thick copper current collector and then dried at 150° C. for 20 minutes and roll-pressed, fabricating a negative electrode.

The negative electrode was used together with a lithium counter electrode, a microporous polyethylene separator, and an electrolyte in a glove box filled with helium, fabricating a coin-type half-cell (2016 R-type). The electrolyte was prepared by mixing ethylene carbonate, diethylene carbonate, and ethyl-methyl carbonate in a volume ratio of 30:30:40 and dissolving 1.1 M $LiPF_6$ therein.

Example 6

Fabrication of a Rechargeable Lithium Battery

A rechargeable lithium battery was fabricated according to the same method as Example 5, except for using the negative active material of Example 2.

Example 7

Fabrication of a Rechargeable Lithium Battery

A rechargeable lithium battery was fabricated according to the same method as Example 5, except for using the negative active material of Example 3.

Example 8

Fabrication of a Rechargeable Lithium Battery

A rechargeable lithium battery was fabricated according to the same method as Example 5, except for using the negative active material of Example 4.

Comparative Example 1

Fabrication of a Negative Active Material for a Rechargeable Lithium Battery

An alumina (Anodisc, Whatman Co.) template having a hollow part with a diameter of 250 nm was immersed in a 0.6 M $SnCl_4$ aqueous solution (Aldrich 99%) for 4 hours under an air atmosphere. The alumina template with a hollow part was positioned on a filtering sheet and treated under vacuum for 10 minutes. Next, it was dried at 150° C. for 3 hours and calcinated at 600° C. under an air atmosphere for 3 hours. In this way, a $SnO_2$-containing outer layer was formed inside the alumina template with a hollow part.

The alumina template including a $SnO_2$-containing outer layer was rubbed on the surface with fine sand paper, and then treated with a 2M NaOH aqueous solution for one hour to remove the alumina template. The resulting product was washed several times with distilled water. Accordingly, a negative active material for a rechargeable lithium battery was prepared to include have $SnO_2$ and a tube shape.

Comparative Example 2

Fabrication of a Rechargeable Lithium Battery

A coin-type half-cell (2016 R-type) was fabricated according to the same method as Example 2, except for using the negative active material of Comparative Example 1.

Experimental Example 1

X-Ray Diffraction (XRD) Measurement

The negative active materials for a rechargeable lithium battery according to Examples 1 to 4 were evaluated through X-ray diffraction analysis. The result of Example 1 is provided in FIG. 3.

Figure 3:
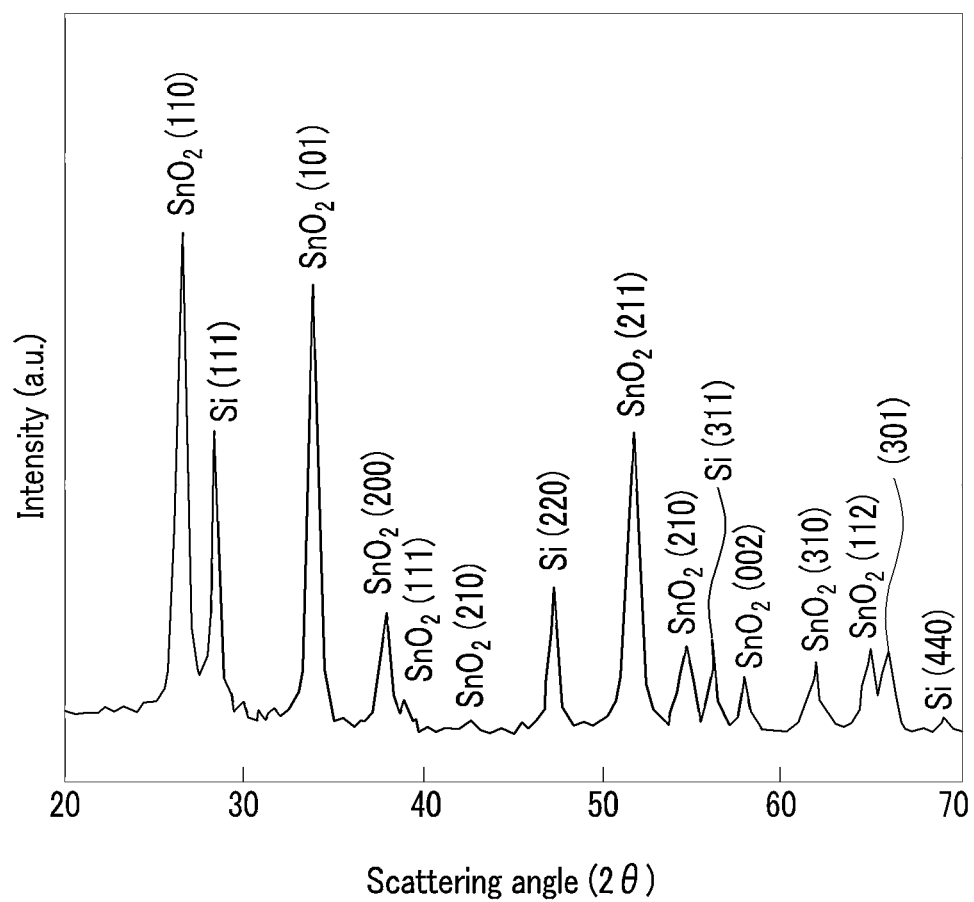
FIG. 3 provides an X-ray diffraction analysis graph of the negative active material for a rechargeable lithium battery according to Example 1.

In the X-ray diffraction analysis, a Cu—K α ray was used as a light source. As shown in FIG. 3, the negative active material for a rechargeable lithium battery turned out to include tetragonal $SnO_2$ and diamond cubic Si.

Experimental Example 2

Scanning Electron Microscope (SEM) Photograph

The negative active materials for a rechargeable lithium battery according to Examples 1 to 4 were photographed with a SEM. The result of Example 1 is provided in FIGS. 4A and 4B.

Figure 4A:
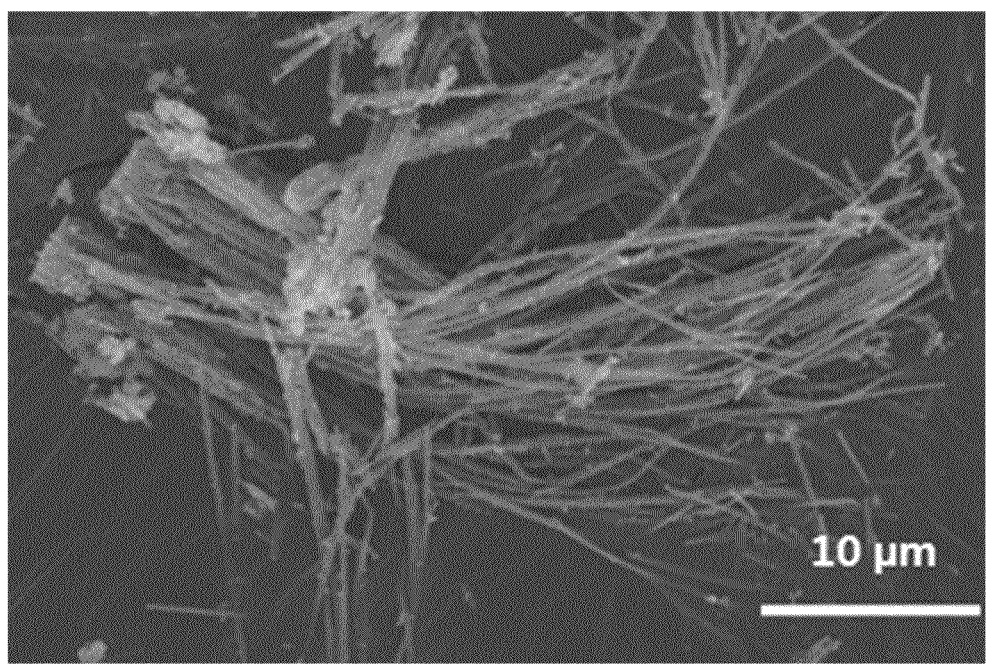
FIGS. 4A and 4B show SEM photographs of the negative active material for a rechargeable lithium battery according to Example 1.
Figure 4B:
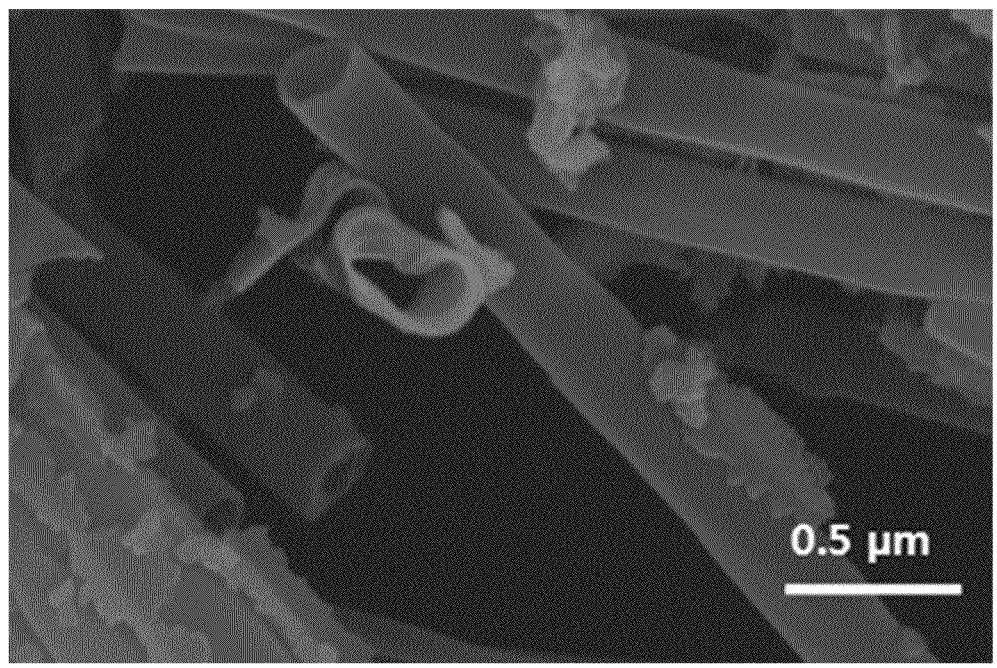

As shown in FIGS. 4A and 4B, the negative active material for a rechargeable lithium battery according to Example 1 turned out to have a tube shape. The negative active material for a rechargeable lithium battery had a length of about 50 μm and a diameter of about 240 nm. It had a hollow part with a diameter of about 200 nm.

The negative active materials for a rechargeable lithium battery according to Examples 1 to 4 were charged and discharged 90 times at 1.2 to 0V at a 0.5 C rate (1000 mA/g) and then photographed with a SEM. The result of Example 1 is provided in FIG. 4C.

Figure 4C:
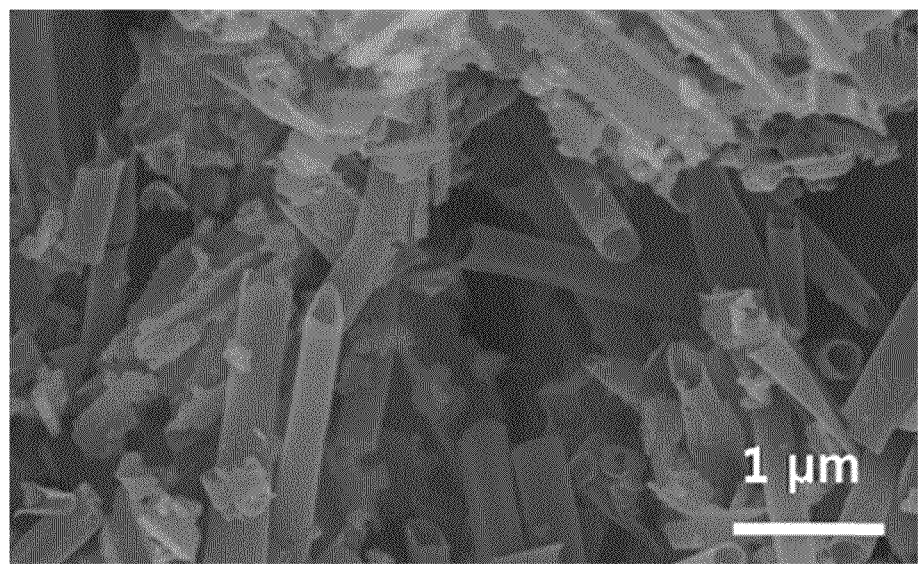
FIG. 4C provides a SEM photograph of the negative active material for a rechargeable lithium battery according to Example 1 after 90 charges and discharges.

As shown in FIG. 4C, the negative active material for a rechargeable lithium battery according to Example 1 maintained a tube shape after being charged and discharged 90 times at 1.2 to 0V at a 0.5 C rate (1000 mA/g).

Experimental Example 3

Figure 5A:
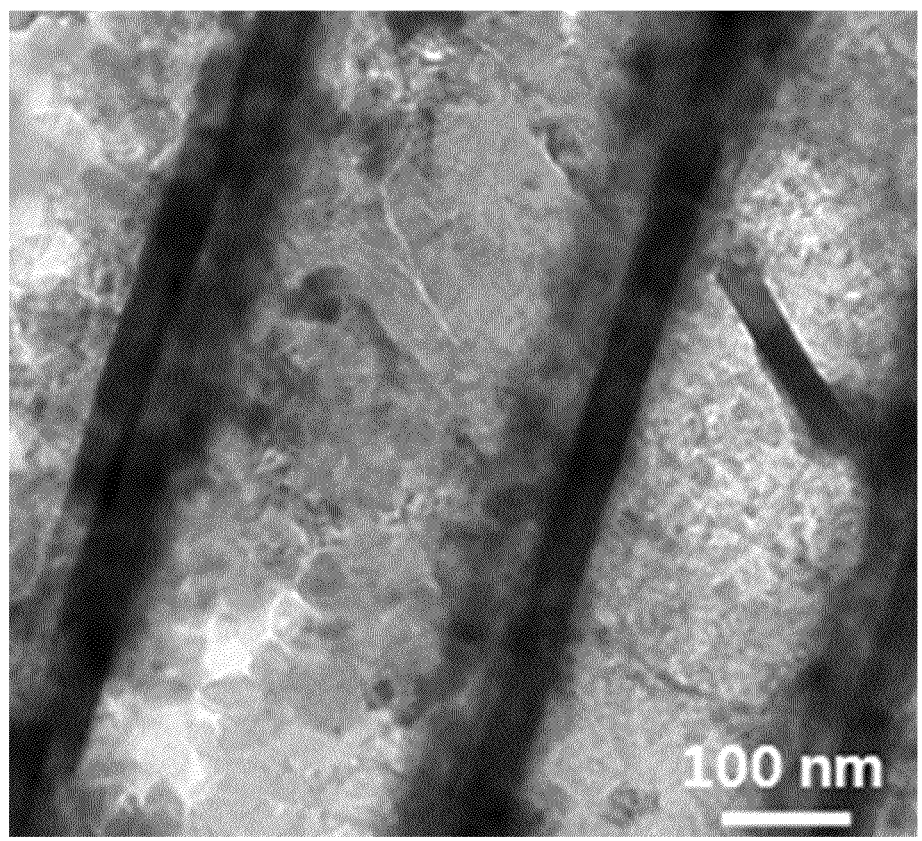
FIG. 5A shows a TEM photograph of the negative active material for a rechargeable lithium battery according to Example 1.

Transmission Electron Microscope (TEM) and High Resolution Transmission Electron Microscope (HRTEM) Photographs The negative active materials for a rechargeable lithium battery according to Examples 1 to 4 were deposited on a copper grid coated with carbon and a cross-section thereof was photographed with a TEM and an HRTEM. FIG. 5A shows a TEM photograph of the negative active material for a rechargeable lithium battery according to Example 1, and FIGS. 5B and 5C show HRTEM photographs.

As shown in FIG. 5A, the negative active material for a rechargeable lithium battery according to Example 1 was about 50 nm thick except for the hollow part.

Figure 5B:
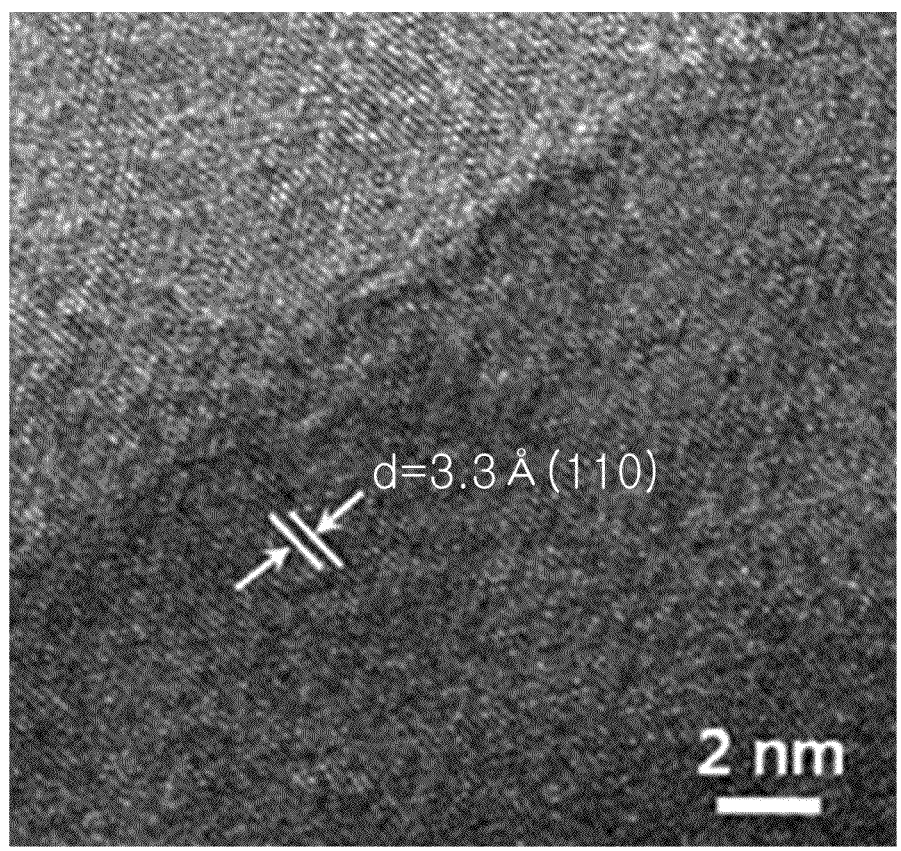
FIGS. 5B and 5C show HRTEM photographs of the negative active material for a rechargeable lithium battery according to Example 1.
Figure 5C:
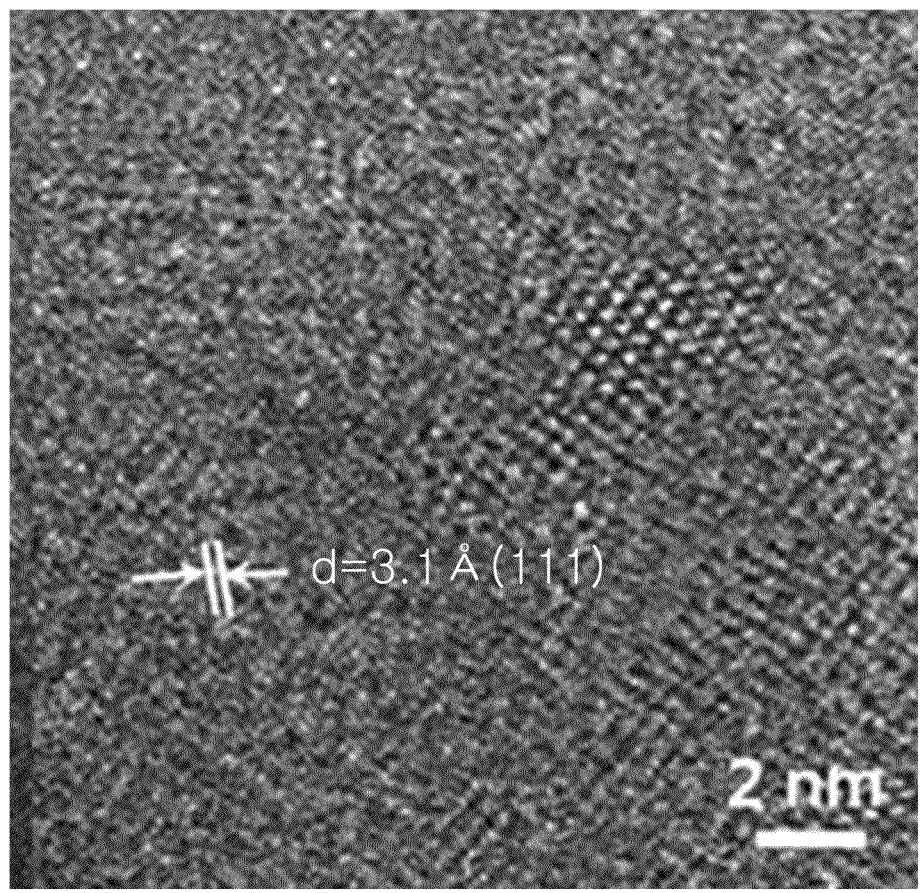

FIGS. 5B and 5C show a lattice fringe 110 indicating $SnO_2$ and a lattice fringe 111 indicating Si. Accordingly, the negative active material for a rechargeable lithium battery according to Example 1 turned out to include $SnO_2$ and Si.

The negative active materials according to Examples 1 to 4 and Comparative Example 1 were charged and discharged 90 times at 1.2 to 0V at a 0.5 C rate (1000 mA/g) and then photographed with a TEM. The results of Example 1 and Comparative Example 1 are respectively provided in FIGS. 5D and 5E.

Figure 5D:
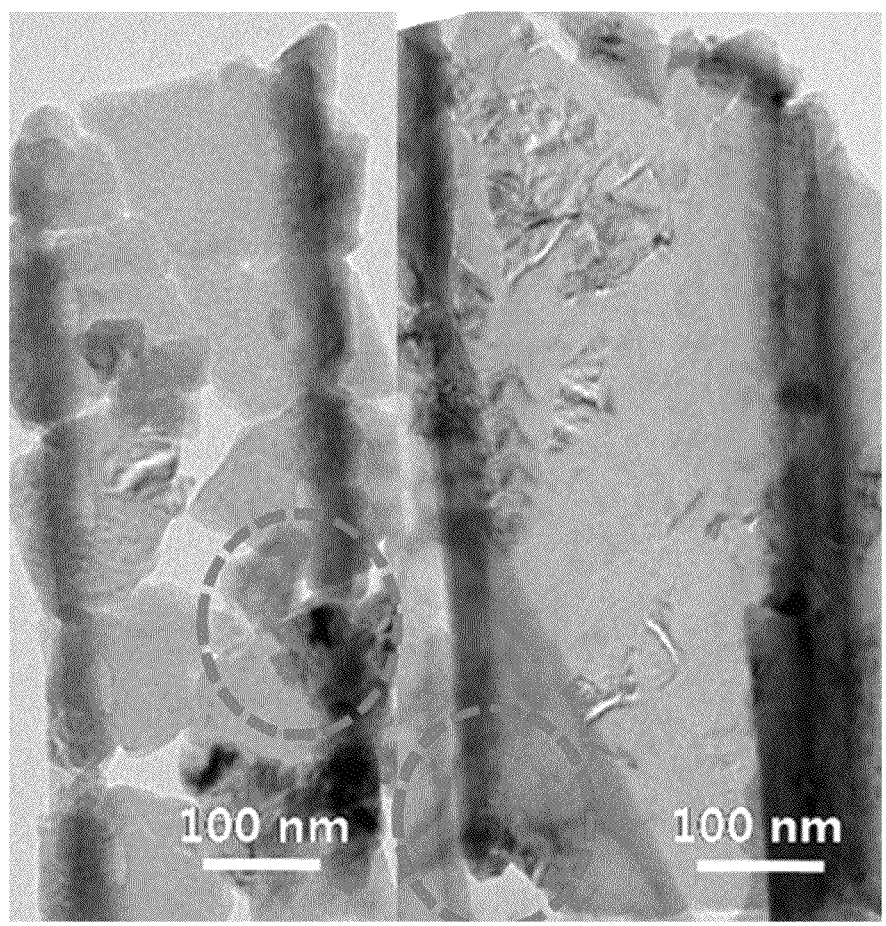
FIG. 5D shows a TEM photograph of the negative active material for a rechargeable lithium battery according to Example 1 after 90 charges and discharges.

As shown in FIG. 5D, the negative active material according to Example 1 maintained a tube shape after being charged and discharged 90 times at 1.2 to 0V at a 0.5 C rate (1000 mA/g), despite partial destruction at the dotted circular line.

Figure 5E:
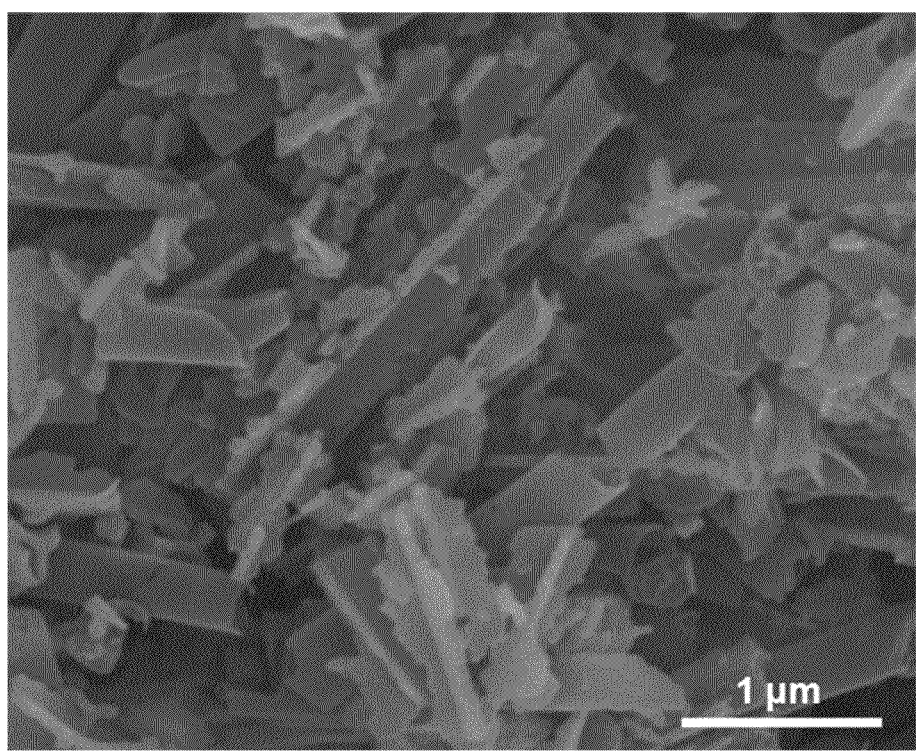
FIG. 5E shows a TEM photograph of the negative active material for a rechargeable lithium battery according to Comparative Example 1 after 90 charges and discharges.

On the other hand, as shown in FIG. 5E, the negative active material for a rechargeable lithium battery according to Comparative Example 1 had a tube shape mostly destroyed after being charged and discharged 90 times at 1.2 to 0V at a 0.5 C rate (1000 mA/g).

Experimental Example 4

Auger Electron Spectroscopy

The negative active materials for a rechargeable lithium battery according to Examples 1 to 4 were analyzed from the external surface to a depth with Auger electron spectroscopy by using PHI-Perkin-Elmer model 10-155 equipment. The result of Example 1 is provided in FIG. 6.

Figure 6:
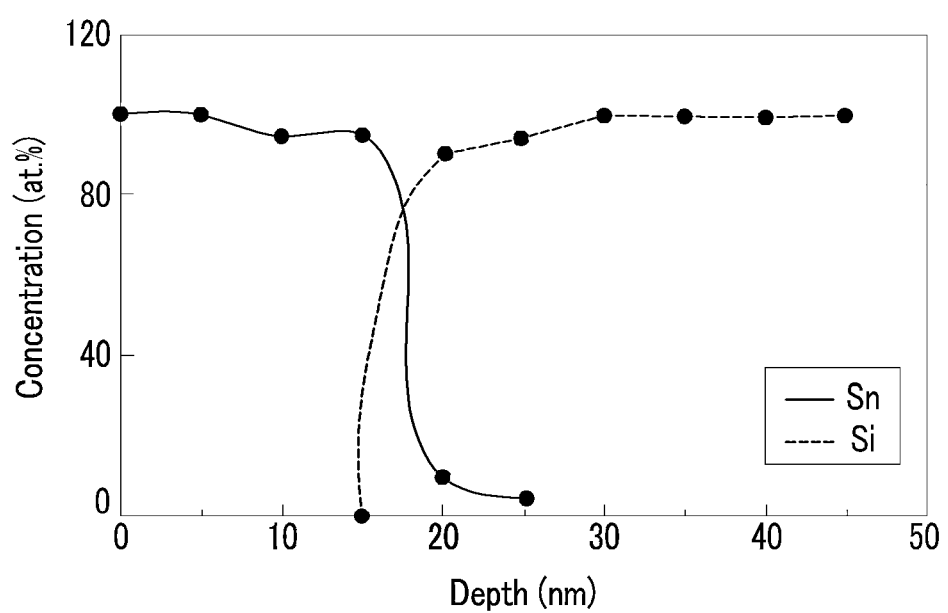
FIG. 6 shows an Auger electron spectroscopy analysis graph of the negative active material for a rechargeable lithium battery according to Example FIG. 7 provides a graph showing charge capacity of halfcells according to Example 5 and Comparative Example 2 depending on the number of cycles.

As shown in FIG. 6, the negative active material according to Example 1 had a tube of which the external surface included $SnO_2$ including Sn atoms. The tube had a Sn atom concentration decrease and a Si atom concentration increase deeper inside. There was a depth region where Sn atoms coexisted with Si atoms, since the negative active material had a rough interface between inner and outer layers. Accordingly, there were Sn atoms in one region but Si atoms in another region at the same depth.

Experimental Example 5

CHS (Carbon-Hydrogen-Sulfur) Analysis

The negative active materials according to Examples 1 to 4 were analyzed regarding CHS. As a result, the negative active material of Example 1 included 11 wt % of carbon, that of Example 2 included 17 wt % of carbon, that of Example 3 included 35 wt % of carbon, and that of Example 4 included 25 wt % of carbon.

Experimental Example 6

Inductively-Coupled Plasma-Mass Spectroscopy (ICP-MS)

The negative active materials according to Examples 1 to 4 were analyzed regarding inductively-coupled plasma-mass in order to determine a weight ratio of $SnO_2$:Si. As a result, the negative active material of Example 1 included $SnO_2$ and Si in a weight ratio of 6:4, that of Example 2 included SnO$_2$ and Si in a weight ratio of 5:5, that of Example 3 included SnO$_2$ and Si in a weight ratio of 2:8, and that of Example 4 included SnO$_2$ and Si in a weight ratio of 3:7.

Experimental Example 7

BET Surface Area

The negative active materials according to Examples 1 to 4 were evaluated regarding nitrogen adsorption isotherms using a Micrometrics ASAP 2020 system in order to measure surface areas. As a result of calculating surface areas using BET (Brunauer-Emmett-Teller), the negative active material of Example 1 had a specific surface area of 34 m$^2$/g, that of Example 2 had a specific surface area of 38 m$^2$/g, that of Example 3 had a specific surface area of 14 m$^2$/g, and that of Example 4 had a specific surface area of 15 m$^2$/g.

Experimental Example 8

Reversible Capacity and Coulomb Efficiency

The half-cells according to Examples 5 to 8 and Comparative Example 2 were charged and discharged once at 1.2 to 0V at a 0.2 C rate (400 mA/g) and then evaluated regarding reversible capacity and coulomb efficiency.

The half-cell according to Example 5 had reversible capacity of 1838 mAh/g and coulomb efficiency of 67%, that of Example 6 had reversible capacity of 2000 mAh/g and coulomb efficiency of 76%, that of Example 7 had reversible capacity of 3100 mAh/g and coulomb efficiency of 86%, and that of Example 8 had reversible capacity of 2780 mAh/g and coulomb efficiency of 80%. On the other hand, the half-cell of Comparative Example 2 had reversible capacity of 946 mAh/g and coulomb efficiency of 42%.

In addition, the half-cells according to Examples 5 to 8 and Comparative Example 2 were charged and discharged once at 1.2 to 0V at a 0.5 C rate (1000 mA/g) and then evaluated regarding reversible capacity and coulomb efficiency.

The half-cell of Example 5 had reversible capacity of 1829 mAh/g and coulomb efficiency of 65%, that of Example 6 had reversible capacity of 1910 mAh/g and coulomb efficiency of 74%, that of Example 7 had reversible capacity of 2600 mAh/g and coulomb efficiency of 84%, and that of Example 8 had reversible capacity of 2000 mAh/g and coulomb efficiency of 78%. On the other hand, the half-cell of Comparative Example 2 had reversible capacity of 805 mAh/g and coulomb efficiency of 40%.

Accordingly, the half-cells of Examples 5 to 8 had higher reversible capacity and coulomb efficiency than that of Comparative Example 2.

Experimental Example 9

Cycle Life Characteristics

The half-cells according to Examples 5 to 8 and Comparative Example 2 were charged and discharged 90 times at 1.2 to 0V at a 0.5 C rate (1000 mA/g). The results of Example 5 and Comparative Example 2 are provided in FIG. 7.

Figure 7:
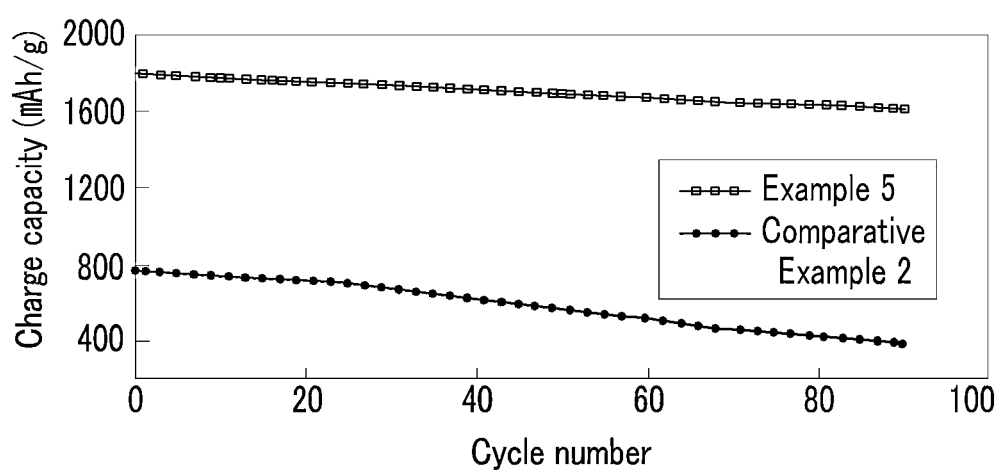

As shown in FIG. 7, the half-cell of Example 5 was charged at a 0.5 C rate 90 times, and had charge capacity of 1838 mAh/g and capacity retention of 90%. When it was charged and discharged at a 0.5 C rate, it had comparatively stable charge capacity during 90 cycles. The negative active material included in Example 5 had a tube shape that was not damaged but was well maintained.

On the other hand, the half-cell of Comparative Example 2 was charged 90 times at a 0.5 C rate, and had charge capacity of 400 mAh/g and capacity retention of 50%. When it was charged and discharged at a 0.5 C rate, it had a gradually decreasing charge capacity during the 90 cycles. The negative active material used in Comparative Example 2 had a continually-damaged tube shape.

Experimental Example 10

Rate Capability

The half-cells according to Examples 5 to 8 were respectively charged and discharged once at 1.2 to 0V at 0.2 C, 0.5 C, and 2 C rates, and measured regarding rate capability. The half-cell of Example 5 had a charge capacity of 1838 mAh/g at a 0.2 C rate, a charge capacity of 1829 mAh/g at a 0.5 C rate, and a charge capacity of 1710 mAh/g at a 2 C rate. In the half-cell of Example 5, the ratio of the 2 C charge capacity to the 0.2 C charge capacity was 93%. In addition, the half-cell of Example 6 respectively had a charge capacity of 2000 mAh/g at a 0.2 C rate, a charge capacity of 1820 mAh/g at a 0.5 C rate, and a charge capacity of 1910 mAh/g at a 2 C rate. In the half-cell of Example 6, the ratio of the 2 C charge capacity to the 0.2 C charge capacity was 91%. Accordingly, the half-cells of Examples 5 to 8 had excellent rate capability.

The half-cell of Comparative Example 2 was respectively charged and discharged once at 1.2 to 0V at 0.2 C, 0.5 C, and 2 C rates, and measured regarding rate capability. As a result, it had a charge capacity of 946 mAh/g at a 0.2 C rate, a charge capacity of 805 mAh/g at a 0.5 C rate, and a charge capacity of 654 mAh/g at a 2 C rate. In the half-cell of Comparative Example 2, the ratio of the 2 C charge capacity to the 0.2 C charge capacity was 69%. Accordingly, the half-cell of Comparative Example 2 had bad rate capability.

The reason is that negative active materials according to Examples 1 to 4 include an inner layer including a material capable of doping and dedoping lithium and a carbon layer, which play a role of buffering against volume expansion and contraction due to the doping and dedoping of lithium, and also preventing and alleviating shape destruction of the negative active material.

The present invention is not limited by the exemplary embodiments but may be prepared into various modifications without specifically changing the technical spirit or necessary features, which can be easily understood by those who have common knowledge in this related field. Therefore, the aforementioned embodiments are exemplary but not limiting in any way.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A method of preparing a negative active material for a rechargeable lithium battery, comprising:
 preparing a tube-shaped template with a hollow part;
 forming a first layer comprising a material being capable of doping and dedoping lithium inside the tube-shaped template;

forming an inner precursor layer comprising a material being capable of doping and dedoping lithium which includes an organic functional group inside the first layer;

forming a carbon layer and a second layer inside the first layer by annealing the tube-shaped template; and removing the tube-shaped template from the first layer, wherein each of the second layer, the carbon layer and the first layer has a tube shape, the carbon layer surrounds the second layer and the first layer surrounds the carbon layer.

2. The method of claim 1, wherein the organic functional group is represented as CnHm, and wherein the n and m are integers of 1 or more.

3. The method of claim 2, wherein the organic functional group is selected from the group consisting of a C1 to C30 aliphatic group, a C3 to C30 alicyclic group, a C6 to C30 aromatic group, and a combination thereof.

4. The method of claim 1, wherein the annealing is performed at a temperature ranging from about 700° C. to about 1100° C.

5. The method of claim 1, wherein the tube-shaped template is removed using a basic or acidic material.

6. The method of claim 5, wherein the basic material or the acidic material has a concentration ranging from about 1M to about 6M.

* * * * *